US010222494B2

(12) United States Patent  
Teyssandier et al.

(10) Patent No.: US 10,222,494 B2  
(45) Date of Patent: Mar. 5, 2019

(54) ADAPTIVE SWEEP METHOD AND DEVICE FOR SEISMIC EXPLORATION

(71) Applicant: CGG Services SA, Massy (FR)

(72) Inventors: Benoit Teyssandier, Massy (FR); Robert Dowle, Massy (FR); Laurent Ruet, Massy (FR); John Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 1257 days.

(21) Appl. No.: 13/962,250

(22) Filed: Aug. 8, 2013

(65) Prior Publication Data  
US 2014/0043937 A1 Feb. 13, 2014

Related U.S. Application Data

(60) Provisional application No. 61/681,196, filed on Aug. 9, 2012.

(51) Int. Cl.  
G01V 1/40 (2006.01)  
G01V 1/00 (2006.01)  
G01V 1/38 (2006.01)

(52) U.S. Cl.  
CPC ............ G01V 1/005 (2013.01); G01V 1/3808 (2013.01)

(58) Field of Classification Search  
USPC .......................................................... 367/49  
See application file for complete search history.

(56) References Cited

U.S. PATENT DOCUMENTS

| | | | | | |
|---|---|---|---|---|---|
| 3,629,800 | A | * | 12/1971 | Schneider | G01V 1/366 367/24 |
| 4,204,279 | A | * | 5/1980 | Parrack | G01V 1/366 367/40 |
| 4,312,050 | A | * | 1/1982 | Lucas | G01V 1/28 367/43 |
| 4,323,876 | A | * | 4/1982 | Parrack | G01V 1/366 367/40 |
| 4,458,339 | A | * | 7/1984 | Wason | G01V 1/247 367/14 |

(Continued)

FOREIGN PATENT DOCUMENTS

| | | |
|---|---|---|
| EP | 2624015 A2 | 8/2013 |
| WO | 2012/123883 A2 | 9/2012 |

OTHER PUBLICATIONS

Lavergne, M. Seismic Methods. London: Graham & Trotman, 1989. Print. ISBN: 1853332240.*

(Continued)

Primary Examiner — Isam A Alsomiri  
Assistant Examiner — Jonathan D Armstrong  
(74) Attorney, Agent, or Firm — Patent Portfolio Builders PLLC

(57) ABSTRACT

Controller and method for adapting a frequency sweep for a vibro-acoustic source element that is configured to generate acoustic waves during a seismic survey. The method includes driving a seismic source element to generate a current frequency sweep; recording seismic data with plural seismic sensors in response to the current frequency sweep; selecting, during the seismic survey, a data subset of the seismic data, wherein the data subset has a size less than 10% of the seismic data; calculating with a processing device an attribute based on the data subset; and calculating a new frequency sweep based on the attribute.

20 Claims, 9 Drawing Sheets

(56) References Cited

U.S. PATENT DOCUMENTS

| | | |
|---|---|---|
| 4,598,392 A | 7/1986 | Pann |
| 4,782,446 A | 11/1988 | Ehler et al. |
| 5,721,710 A | 2/1998 | Sallas et al. |
| 5,933,790 A * | 8/1999 | Jeffryes .................... G01V 1/22 |
| | | 702/17 |
| 5,991,235 A | 11/1999 | Allen |
| 6,366,857 B1 * | 4/2002 | Bird et al. .......................... 702/2 |
| 6,516,275 B2 * | 2/2003 | Lazaratos ....................... 702/17 |
| 6,942,059 B2 | 9/2005 | Smith |
| 7,295,490 B1 * | 11/2007 | Chiu et al. ...................... 367/48 |
| 8,274,862 B2 | 9/2012 | Sallas |
| 8,619,497 B1 | 12/2013 | Sallas et al. |
| 2002/0141287 A1 | 10/2002 | Lazaratos |
| 2002/0152032 A1 | 10/2002 | Bird et al. |
| 2003/0093224 A1 | 5/2003 | Jeffryes |
| 2007/0286019 A1 | 12/2007 | Love et al. |
| 2008/0137476 A1 * | 6/2008 | Eick et al. ...................... 367/38 |
| 2008/0192569 A1 * | 8/2008 | Ray ........................ G01V 1/247 |
| | | 367/15 |
| 2009/0076730 A1 | 3/2009 | Johnson et al. |
| 2009/0310442 A1 | 12/2009 | Love et al. |
| 2010/0020640 A1 | 1/2010 | Eick et al. |
| 2010/0110831 A1 | 5/2010 | Love et al. |
| 2010/0118647 A1 | 5/2010 | Tenghamn |
| 2011/0013482 A1 * | 1/2011 | Eick et al. ...................... 367/38 |
| 2013/0100766 A1 | 4/2013 | Ruet et al. |
| 2013/0163385 A1 * | 6/2013 | Sallas ............................ 367/189 |

OTHER PUBLICATIONS

UK Search Report dated Jan. 29, 2014, in related British Application No. GB1314056.1.
DK Search Report dated Mar. 19, 2014, in related Danish Application No. PA 2013 70436 (Two of the documents cited in this Search Report were provided with the IDS filed Aug. 8, 2013)
DK Examination Report dated Mar. 19, 2014, in related Danish Application No. PA 2013 70436.
DK Office Action dated Dec. 11, 2014, in related Danish Application No. PA 2013 70436. (Reference cited in this Office Action was provided with IDS filed Aug. 8, 2013.).
Examination Report dated Sep. 15, 2015 in corresponding Danish Patent Application No. PA 2013 70436. (U.S. Pat. No. 5,991,235 was previously cited in an IDS dated Sep. 10, 2014.).
Office Action in corresponding Mexico Application No. 2013/009072 dated Jun. 5, 2015. (Reference previously submitted with IDS on Aug. 8, 2013.).
Office Action in corresponding Chinese Application No. 201310346924.2 dated Dec. 5, 2016. (Reference US 2009/076730A1 was submitted in an Information Disclosure Statement dated Aug. 8, 2013 and U.S. Pat. No. 6,366,857B1 was in an Office Action dated Aug. 21, 2015.).
Office Action in corresponding Great Britain Application No. GB1314056.1 dated May 25, 2017. (Cited reference U.S. Pat. No. 5,991,235 was made of record in an Information Disclosure Statement submitted on Sep. 10, 2014.).
Examination Report in corresponding Great Britain Application No. GB1314056.1 dated Sep. 12, 2017.

* cited by examiner

ADAPTIVE SWEEP METHOD AND DEVICE FOR SEISMIC EXPLORATION

BACKGROUND

Technical Field

Embodiments of the subject matter disclosed herein generally relate to methods and systems and, more particularly, to mechanisms and techniques for updating and/or optimizing a driving signal of a seismic source.

Discussion of the Background

Reflection seismology is a method of geophysical exploration to determine the properties of a portion of a subsurface layer in the earth, which is information especially helpful in the oil and gas industry. Marine reflection seismology is based on the use of a controlled source that sends energy waves into the earth. By measuring the time it takes for the reflections to come back to one or more receivers, it is possible to estimate the depth and/or composition of the features causing such reflections. These features may be associated with subterranean hydrocarbon deposits.

For marine applications, sources are typically impulsive, e.g., compressed air stored in an air gun is suddenly allowed to expand, thus forming an oscillating air bubble that generates seismic energy. An air gun produces a great amount of acoustic energy over a short time. Such a source is towed by a vessel either at the water surface or at a certain depth. The acoustic waves from the air gun propagate in all directions. A typical frequency range of the emitted acoustic waves is between 6 and 300 Hz. However, the frequency content of impulsive sources is not fully controllable, and different sources are selected depending on a particular survey's needs. In addition, the use of impulsive sources can pose certain safety and environmental concerns. A further disadvantage of air guns is the inability to adjust frequency spectrum or frequency content while the air guns are towed in water and activated.

Another class of sources that may overcome some of the air guns' limitations are vibratory sources. Vibratory sources, including hydraulically, electrically, or pneumatically powered sources and sources employing piezoelectric or magnetostrictive material, have been used in marine operations.

A vibratory source generates a long tone with a varying frequency, i.e., a frequency sweep when a pilot signal is applied to the source. Typically, the pilot signal is stored in a vibrator controller memory. Upon receiving a start command from the seismic acquisition management system, the vibrator controller generates the pilot signal and uses it as a reference signal input to a closed-loop feedback control system whose function is to slave, for example, the motion of a moving part, like an acoustic piston to the pilot signal. The motion of the piston displaces a volume of water, which generates a corresponding seismic wave. The instantaneous pressure resulting from the movement of one or more pistons corresponding to plural marine vibrators may be lower than that of an air gun array, but the total acoustic energy the marine vibrator transmits may be similar to the energy of the air gun array due to the extended duration of the vibratory source's signal. However, such sources need a frequency sweep to achieve the required energy. The term frequency sweep, can refer to either a swept sine wave or a band-limited pseudorandom signal, designed to have a non-zero amplitude spectrum over a range of frequencies using a continuous or semi-continuous signal that is used as a pilot signal to excite the seismic source over some time duration.

U.S. Patent Application Publication No. 20100118647A1, entitled, "Method for optimizing energy output from a seismic vibrator array," the entire disclosure of which is incorporated herein by reference, discloses two flextensional vibrators (low frequency and high frequency) activated by electro-mechanical actuators and emitting seismic energy at two different depths during a frequency sweep. The vibrators are driven by swept frequency signals, each having a different selected frequency response.

A non-linear frequency sweep is also described in U.S. Pat. No. 6,942,059B2, entitled, "Composite bandwidth marine vibroseis array," the entire content of which is incorporated herein by reference. This document discloses a method for seismic marine survey using vibrator sources, each of them placed at different depths. The vibrator sources show a level of seismic energy comparable to an air gun array (single depth) by dividing the seismic bandwidth over a plurality of different bandwidths. Each bandwidth is generated by a vibrator array using a non-linear sweep in order to maximize output energy.

A more sophisticated sweep design method applied to hydraulic seismic vibrators is disclosed in U.S. Pat. No. 8,274,862, entitled, "System and method for determining a frequency sweep for seismic analysis," (assigned to the assignee of the present application), the entire content of which is incorporated herein by reference. This method takes into account not only the plate stroke limit, but also other land vibrator constraints, e.g., the pump flow limit and the servo valve flow limit. U.S. patent application Ser. No. 13/677,661 entitled "Device and Method for Continuous Data Acquisition," (assigned to the assignee of the present application), the entire content of which is incorporated herein by reference, teaches a method for generating a marine vibrator pilot signal that is a band-limited pseudo-random signal so that a target amplitude spectrum can be achieved given certain system operating constraints.

However, no existing method is flexible enough to update and/or optimize the frequency sweep as various field conditions dictate. Thus, there is a need to provide a method for monitoring one or more features related to the source and/or its environment and updating the frequency sweep based on results of the monitoring process.

SUMMARY

According to one exemplary embodiment, there is a method for adapting a frequency sweep for a vibro-acoustic source element that is configured to generate acoustic waves during a seismic survey. The method includes driving a seismic source element to generate a current frequency sweep; recording seismic data with plural seismic sensors in response to the current frequency sweep; selecting, during the seismic survey, a data subset of the seismic data, wherein the data subset has a size less than 10% of the seismic data; calculating with a processing device an attribute based on the data subset; and calculating a new frequency sweep based on the attribute.

According to another exemplary embodiment, there is a method for adapting a frequency sweep for a vibro-acoustic source element that is configured to generate acoustic waves during a seismic survey. The method includes driving a seismic source element to generate a current frequency sweep; recording seismic data with plural seismic sensors in response to the current frequency sweep; selecting, during the seismic survey, a data subset of the seismic data, wherein the data subset has a size less than the seismic data; calculating with a processing device a signal to noise ratio estimate of the selected data subset; and calculating a new frequency sweep based on the signal to noise ratio estimate.

According to still another embodiment, there is a method for adapting a frequency sweep for a vibro-acoustic source element that is configured to generate acoustic waves during a seismic survey. The method includes driving a seismic source element to generate a current frequency sweep; recording seismic data with plural seismic sensors in response to the current frequency sweep; selecting, during the seismic survey, a data subset of the seismic data, wherein the data subset has a size less than of the seismic data; calculating with a processing device an attribute based on the data subset; and calculating a new frequency sweep based on the attribute.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a method for upgrading and/or optimizing an existing driving signal applied to at least a vibro-acoustic source element of a seismic source for modifying an output spectrum based on one or more attributes that are monitored during seismic acquisition.

Figure 4:
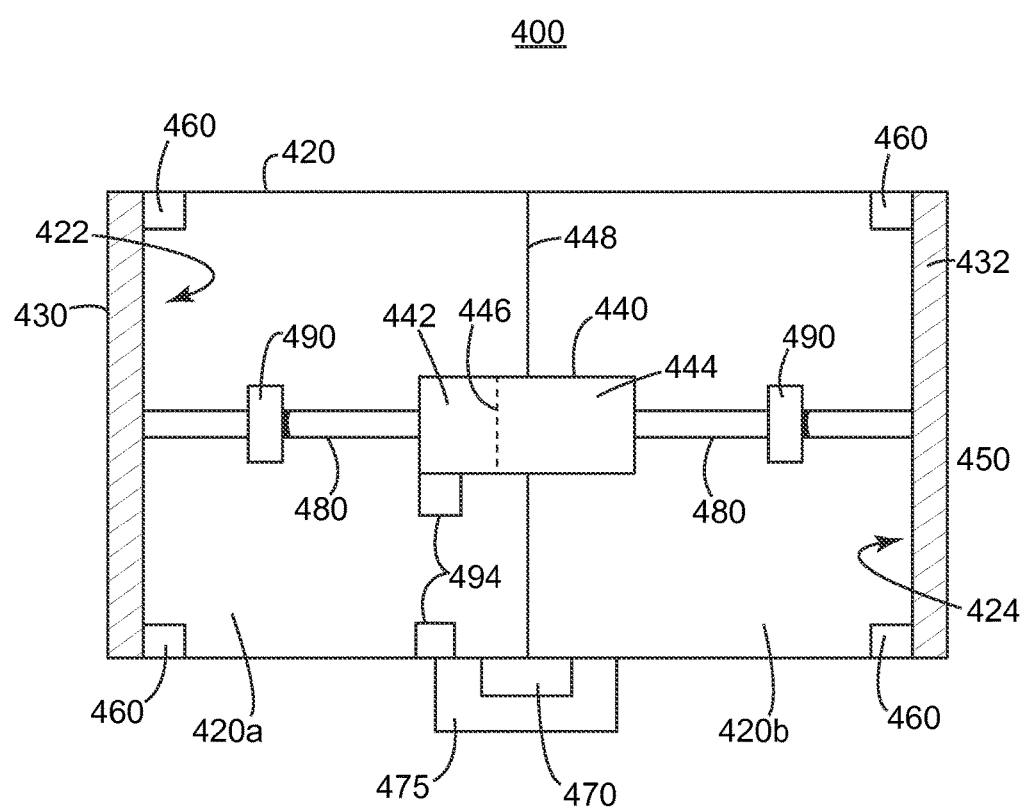
FIG. 4 is a schematic diagram of a driving mechanism for a vibro-acoustic source element.

For simplicity, the following embodiments are discussed with regard to a marine vibro-acoustic source element. However, the embodiments to be discussed next are not limited to a marine seismic source, but may be applied to land seismic sources or other structures that generate a seismic wave having a controlled frequency range. Further, the term "marine" is understood in the following to include fresh water bodies such as a river, delta, pond, swamp, etc., and not only a sea or an ocean. Any type of vibratory source may be used with the novel features. For a better understanding of the inventive concepts, a specific vibratory source is illustrated in FIG. 4, and the novel concepts are applied to this source. However, the novel concepts equally apply to other types of vibratory sources, to an array of such sources, either distributed on land or in a marine environment.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

It is known in the art to design a frequency sweep for a given vibrator source element with the aim of achieving a target energy spectral density (ESD). See for example, J. Sallas, U.S. Pat. No. 8,274,862, the entire content of which is incorporated herein by reference. Sallas explains how various limitations of the vibrator source element, e.g., flow of hydraulic liquid, need to be considered when designing a pilot signal to match an ESD target. Further, patent application Ser. No. 13/687,084, assigned to the same assignee as the present application, discloses a method for determining a pilot signal to match an ESD target by taking into consideration plural features, some associated with the vibratory source element, e.g., various physical constraints of the source element, and others associated with the source element's environment, e.g., a ghost function.

Existing methods design a frequency sweep prior to using the source element, i.e., prior to starting the seismic survey, and the concept of considering source limitations and/or environmental factors when designing the frequency sweep.

However, according to an embodiment, there is a method that monitors one or more attributes (e.g., related to the source, or the environment, etc.) either affected by or influencing an ongoing seismic survey, and updating and/or optimizing a current frequency sweep (i.e., one that has already been designed prior to the seismic survey) based on the monitored one or more attributes. In one application, quality control data received from the data acquisition system may be processed to estimate the attribute.

For example, during processing of marine data acquisition, near-real-time adjustments may be made to a marine vibrator's output spectrum. In this example, a subset of the acquired seismic data may be quickly processed to provide a signal to noise (S/N) estimate (attribute) of the seismic data being recorded with seismic receivers. For marine data acquisition, the receivers may be located on streamers, ocean bottom cables (OBC), ocean bottom nodes (OBN), autonomous underwater vehicles (AUV), or other platforms known in the field. In one application, an S/N estimate for the seismic data received from a predetermined target depth is formed. The S/N estimate may be compared to a preset S/N, i.e., an "acceptance range." If the S/N falls outside the acceptance range for one or more frequencies of interest, but falls within the acceptance range for other frequencies, the vibrator sweep or excitation signal is adjusted accordingly, i.e., the existing frequency sweep is recalculated. Optionally, a second attribute, for example the spectral coherence for the data received from a pre-determined target depth can be formed, compared to a preset acceptance range and used in conjunction with a first attribute to modify the sweep signal.

For example, it is possible for the frequency sweep's spectral content to be reapportioned so that in effect more time is spent at frequencies with low S/N and less time at frequencies having the acceptable S/N. The net effect of updating and/or optimizing the frequency sweep is ensuring that the recorded energy of interest maintains an acceptable S/N level over a pre-determined bandwidth of interest (e.g., 1 to 200 Hz or 5-125 Hz).

Recalculation of the frequency sweep for this embodiment is based on a subset of the acquired seismic data, and it is performed while the seismic survey is underway. Thus, there is no need to stop the seismic survey. Further, estimation of the attribute is performed in near-real time, i.e., as soon as the acquired seismic data subset is received on the vessel, a processing device estimates the attribute and decides whether to update the frequency sweep or not. This is possible because of the data subset's small size. Thus, if the S/N ratio is low for certain frequencies of interest, the method discussed above allows in a manner of minutes, if not seconds, detection and correction of this problem, resulting in improved acquired data. The method may automatically estimate the attribute and also decide whether to update the frequency sweep or not. In another application, the processing device asks the survey operator whether to update the frequency sweep or not.

Figure 1:
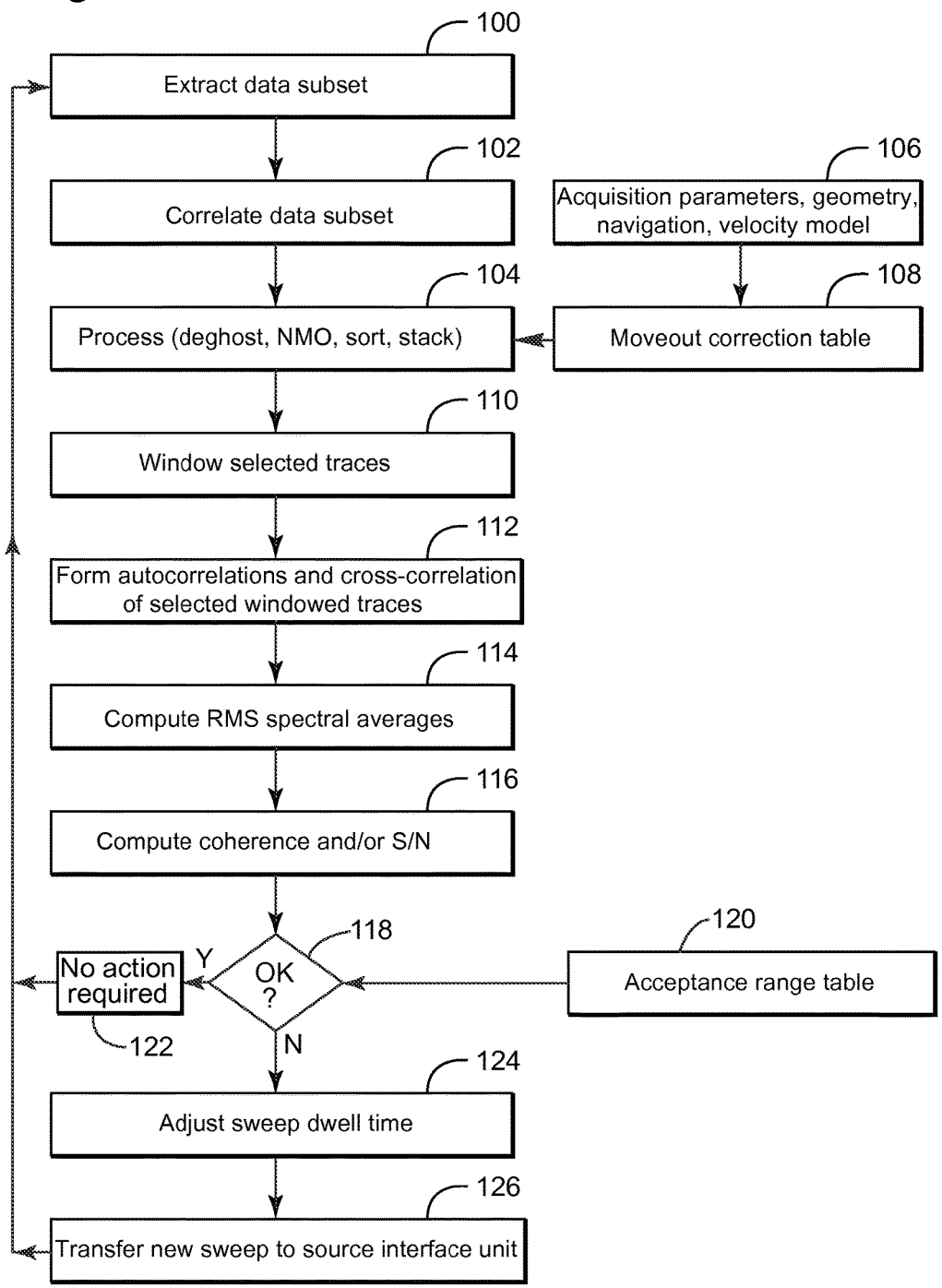
FIG. 1 is a flowchart of a method for updating a frequency sweep during a seismic survey according to an embodiment.

One method that could be employed to calculate the S/N ratio is now discussed with regard to FIG. 1. Note that other methods may be used to estimate the attribute depending on the attribute's nature. According to this embodiment, the method calculates autocorrelations and cross-correlations among selected traces over a window of interest and estimates the S/N ratio and/or coherence based on this information. The method works better if the window is not too short. In other words, this method really uses a measure of the data's coherency across all selected traces.

Discussing this method in more detail, FIG. 1 illustrates a step 100 in which a data subset is extracted from seismic data collected during a seismic survey. As already noted above, the seismic survey may be a land or marine survey. This step may take place while the seismic survey is underway, i.e., while the seismic source is actively vibrating and while receivers are actively recording seismic data. In one application, the seismic survey is underway but the source and receivers are not actively recording, e.g., the vessel towing the streamers and/or the seismic source has just finished a survey line and is actively turning to follow a next survey line. During this turning event, which takes place during the seismic survey, the source may be used for calibration or other purposes but is not generating seismic waves to generate an image of the subsurface being surveyed.

Comparative to the size of the recorded seismic data, which may be in the terabytes (i.e., $10^{12}$) order of magnitude and corresponds to days of seismic survey, the data subset extracted in step 100 is much smaller and it may correspond to minutes and/or hours of recorded seismic data. Further, the size of the data subset is limited from a location standpoint, i.e., if a streamer has 10,000 hydrophones spread along its length, the data subset may include signals only from the first hydrophones along the streamer (e.g., the first 100 hydrophones), or signals only from hydrophones located in the middle of the streamer, or every 101th hydrophone along the streamer. In one application, the seismic survey uses a seismic spread that includes plural streamers, e.g., 8 to 16 streamers. The data subset may be extracted from information received from a single streamer of the seismic spread. In another application, the size of the data subset is less than 1% of the seismic data. The numbers used in this paragraph are illustrative to give the reader a feeling about the reduced size of the data subset relative to the entirety of seismic data recorded during a seismic survey.

If the seismic data is acquired using streamers, this data is transmitted to a processing device located on the towing vessel, and the analysis is performed by dedicated software embedded in the processing device. The same processing device may also be used for other purposes, for example, for controlling the seismic source, for positioning the streamers, etc. The processing device may receive information from the navigation system, e.g., vessel path, location, water currents, water temperature and any other parameter typically used in a seismic survey. If the seismic vessel is equipped with equipment suitable for detection of nearby marine animals, like cetaceans, information about the proximity of these animals can also be received by the processing device. However, if the receivers are distributed on ocean bottom cables (OBCs), ocean bottom nodes, or a mobile underwater platform (e.g., autonomous underwater vehicle, or AUV), the data subset may be collected with some time delay because a remotely operated vehicle (ROV) need to collect the seismic data from the OBCs or the AUVs need to communicate to or dock with a base station to collect the seismic data.

The processing device, which may be located on the towing vessel or on land in a processing facility, correlates the data subset in step 102. The correlation step may include, for example, applying a cross-correlation operation between traces from the data subset and the frequency sweep or pilot signal currently applied to the vibrator source element. In another application, it is possible to use a reference frequency sweep for the cross-correlation operation. In still another application, the current frequency sweep or the reference frequency sweep may be conditioned so that its power spectrum is flat, i.e., does not "color" the power/energy spectrum of the data subset in later steps. Alternatively, only the phase of the pilot signal is used for this step for not altering the power spectrum of the data subset. Such a cross-correlation operation collapses the sweep reflections into wavelets, which are more easily interpreted as corresponding to the reflection interfaces in the subsurface. Other correlation techniques may be applied as would be recognized by those skilled in the art, for example, a deconvolution in which a parameter of the source, e.g., piston acceleration, speed, etc., is used for spectral division.

In step 104, various seismic processes are applied, for example, deghosting, normal moveout, sorting, stacking, etc. These operations are well-known in the art of seismic processing and thus, they are not described herein. Further, not all these operations need to be performed in step 104. One or more of these operations may be performed, depending on the scope of the survey and other parameters. For one or more of these steps, acquisition parameters, geometry of the survey, information regarding navigation of the vessels and/or a velocity model may be supplied in step 106. A moveout correction table may be used in step 108 for processing the information from step 106, and the results of this step are fed to the processes of step 104.

In step 110, traces from the data subset may be windowed so that the amount of data to be processed is further reduced. In one application, a predetermined target depth is selected, and its depth or its corresponding two-way travel time is used for centering the window. (Note that because towed streamers can be quite long, reflection events from the target zone of interest may have significantly different arrival times for receivers that are widely separated, so the window position may be different for groups of receivers that are from different streamer sections.) For example, considering that the two-way travel time of the predetermined depth is 4 s (i.e., the time from the source to the reflecting interface and then to the receiver), the window may extend from 3 to 5 s, i.e., around the predetermined depth. This step further reduces the size of the data to be analyzed for calculating a new frequency sweep. This step and others that reduce the amount of data associated with the data subset are advantageous because the processing to be discussed in later steps is computation-intensive, the processing device available on the vessel has its own limitations and, thus, to achieve almost real-time results is not possible without the data subset having a small size.

Then, in step 112, the selected windowed traces may be processed to form autocorrelations and/or cross-correlations. A cross-correlation process is a measure of similarity of two waveforms (e.g., two traces) as a function of a time lag applied to one of them. The autocorrelation process is similar to the cross-correlation process except that a waveform is cross-correlated with itself. The waveforms used in these two processes are the selected windowed traces obtained in step 110.

A root mean square (RMS) spectral average may be calculated in step 114 for the autocorrelation and/or cross-correlations calculated in step 112, and then a coherence and/or S/N ratio may be obtained in step 116. The RMS spectral average may be calculated by applying a fast Fourier transform (FFT) to the autocorrelation results. The coherence of two traces A and B may be calculated as the frequency by frequency amplitude ratio between (1) the amplitude of the FFT of the cross-correlation result of traces A and B and (2) the square root of the amplitude of the FFT autocorrelation of A multiplied by the amplitude of the FFT autocorrelation of B. Other definitions may be used for coherence as known in the art. The coherence has a value of one for perfect coherence, zero for no coherence, and between zero and one for partial coherence. The S/N ratio may be calculated by performing a ratio between (1) the spectrum of the average of the selected traces that have been aligned in a first window during which signals generated by the source are actively recorded by the seismic sensors (e.g., at 4 s after the source was shot) and (2) the spectral average of the selected traces in a second window during which signals generated by the source are not present or are greatly attenuated (e.g., at 11 s after the source was shot).

In step 118 the S/N ratio is compared to a preset S/N ratio, e.g., an acceptance range. Alternatively, the coherence is compared to a preset coherence value. The acceptance range may be obtained in step 120 from an acceptance range table that may be stored by the processing device. The acceptance range table may be dynamic, i.e., its value may depend on the environment, a position of the vessel, etc. Alternatively, the acceptance range table is static, i.e., it was calculated once for the seismic survey, and it does not change during the survey. If the calculated S/N ratio is within the acceptance range, no action is taken and the process advances to step 122. After some time, the process may be repeated, i.e., start again at step 100.

However, if the S/N ratio is outside the acceptance range, the process advances to step 124 in which the frequency sweep is adjusted. The process of adjusting the frequency sweep may involve the use of a traditional algorithm for calculating a new frequency sweep for which a target spectrum has been modified. FIG. 1 illustrates step 124 as adjusting a dwelling time of the sweep. However, other methods may be envisioned for adjusting the frequency sweep, for example, changing temporal amplitude, etc. Once the new frequency sweep is calculated, it is transmitted in step 126 to the source interface unit, which updates the vibrator source element controller for using the new frequency sweep. After a predetermined time, the entire process is restarted from step 100.

Figure 2:
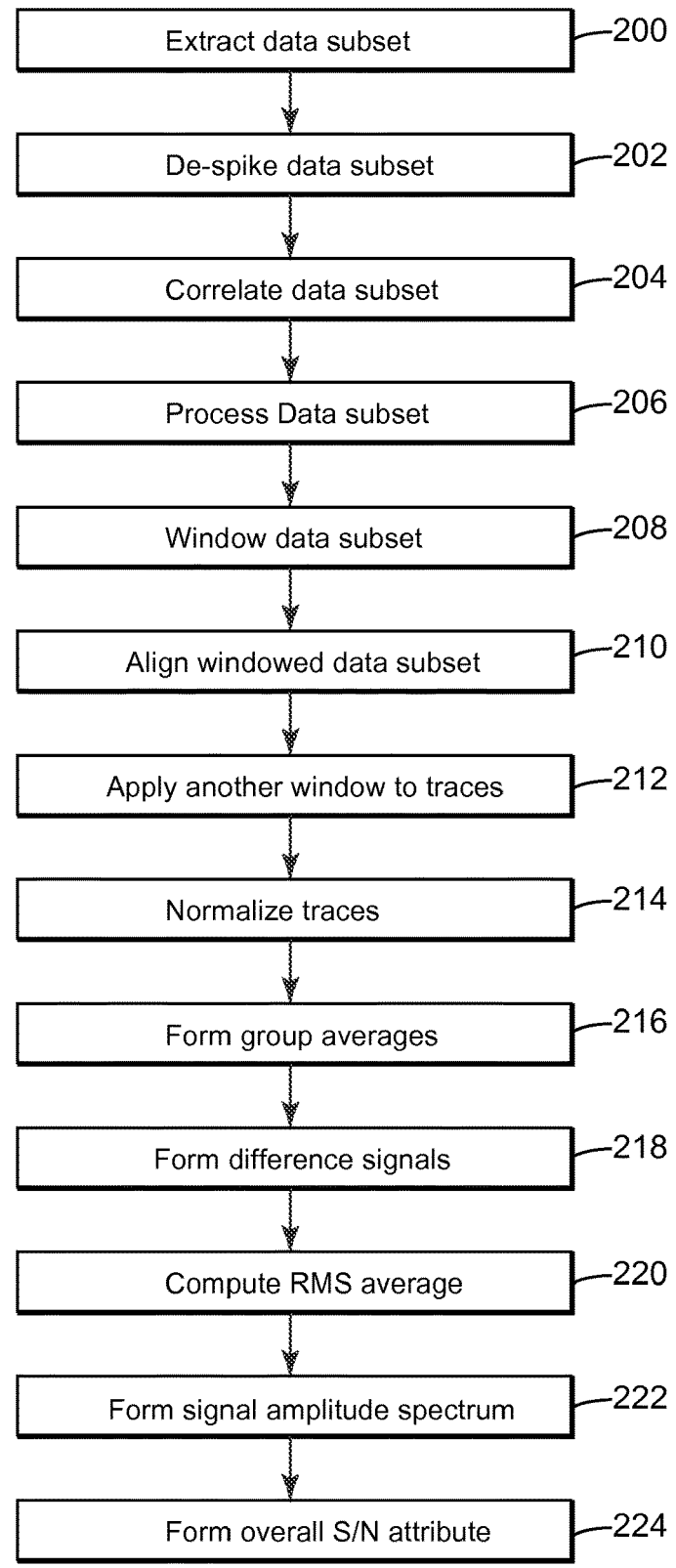
FIG. 2 is a flowchart of a method for estimating a signal to noise attribute.
Figure 3:
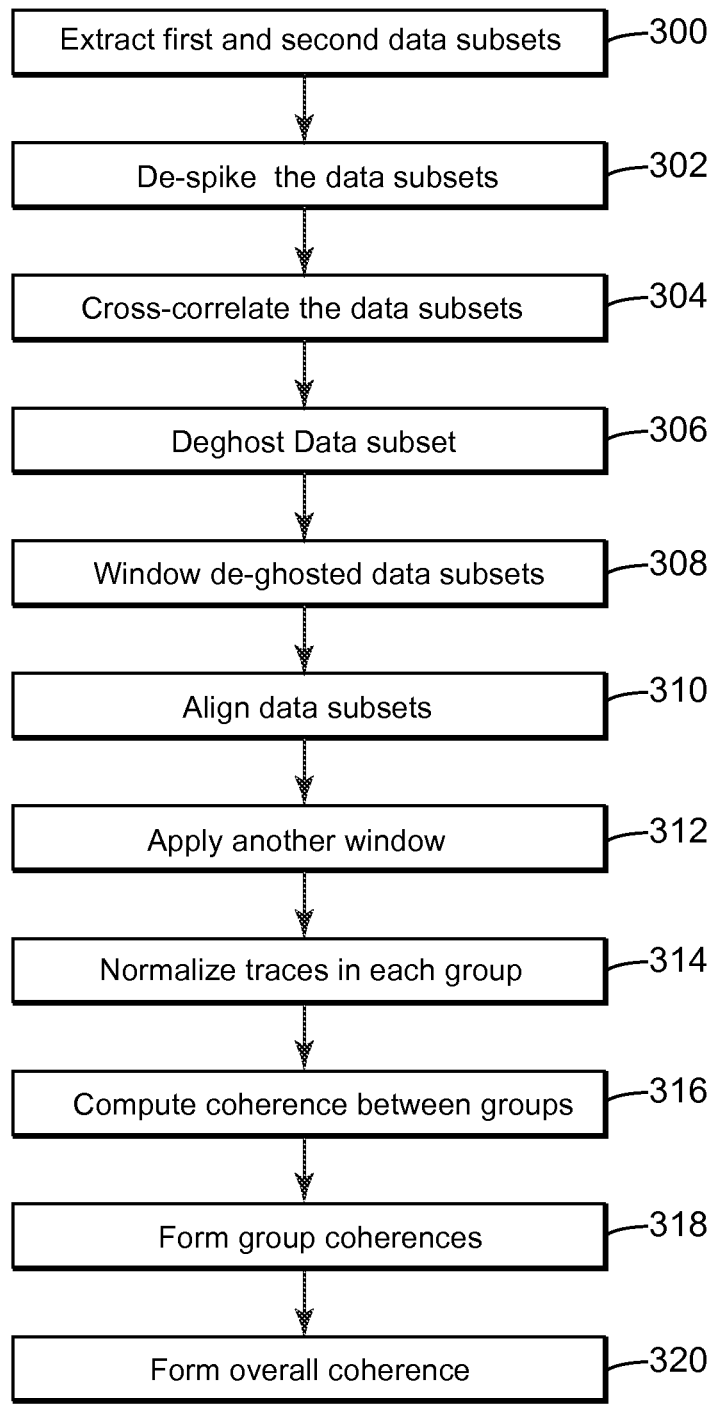
FIG. 3 is a flowchart of a method for estimating a coherence attribute.

Two specific implementations of this method, one for the S/N ratio and one for the temporal spectrum coherence are now discussed with regard to FIGS. 2 and 3. These two methods follow the general algorithm illustrated above with regard to FIG. 1. The flowchart illustrated in FIG. 2 starts with a step 200 in which a data subset is extracted from the seismic data. For example, according to this method three groups of receiver data are extracted from the data acquired for each streamer. The three groups of receiver data may include 24 contiguous channels near the front of the streamer, 24 contiguous channels near the midpoint of the streamer and 24 contiguous channels near the end of the streamer. The selection of groups that are widely spaced apart allows us to take advantage of a property known as ghost diversity when forming an overall average that will be discussed later. In optional step 202, the data subset may be de-spiked. This means that if there are seismic crews operating in the vicinity of the current seismic crew, interfering noise spikes due to the operation of impulsive sources may be present in the data, i.e., seismic interference (SI). It is preferable to remove these before correlation.

In step 204, the receiver data subset is cross-correlated with a pilot signal or reference signal. An optional step 206 may include de-ghosting the data and applying the NMO correction. In step 208 a first windowing is applied to the correlated data subset, centered about a target two-way travel time that is a considerably wider than the zone of interest. In step 210, the windowed data subset (which was previously correlated) is aligned with its group midpoint channel(s). For example, for a group that includes channels 51-74, its midpoint channels would be 62 and 63. For each group, the reflection events are time shifted to align or flatten the event horizons in the target zone of interest.

In step 212, a second window is applied to data traces for each group. The window is centered in time about the center of the target time of interest. The second window is selected to be wide enough to permit a good spectral estimate for the lowest frequency of interest, typically, several cycle periods. In step 214, the trace in each group is normalized by the RMS level within the windowed data from step 212. The normalization process takes care of any difference in sensitivity between the receiver channels.

In step 216, form group averages for the normalized aligned traces within each group. Thus, in this step the method has calculated a signal estimate for group one, another signal for group two and another signal for group three. In step 218, the method forms the difference signals for each group, by subtracting from each normalized trace the group signal estimate (group average). These differences are the noise estimates for each trace. In step 220, apply an FFT to the trace noise estimates from step 218 and compute the RMS average of the amplitude spectra for each group. In step 222, apply the FFT to the signal estimate from step 216 to form the signal amplitude spectrum for each group and in step 224 compute the S/N ratio versus frequency for each group by dividing the group signal estimates frequency by frequency by the corresponding group noise estimate formed in step 220.

Then, in step 224, form an overall S/N attribute by combining the group estimates from step 222. The combination could be spectrally weighted, if for example, there are known noise mechanisms that are desired to be discounted in certain portions of the streamer. Spectral weighting is also useful for discounting spectral estimates that are formed near spectral notches due to the destructive interference of the surface reflection. Because of notch diversity, the combining of attribute estimates in this fashion will lead to a more robust overall attribute estimate that is representative of the quality of all the data being acquired. Furthermore, if more than one streamer is being towed, the overall attribute can be obtained by combining the estimates from the various selected groups from each streamer. This result can be fed in step 118, in the method illustrated in FIG. 1, for adjusting the frequency sweep for the vibrator.

Another attribute is now discussed with reference to FIG. 3. This attribute is related to the temporal spectral coherence. For this method it is assumed that the vessel's velocity is known and that over a short interval of time, receivers located behind receivers located closer to the towing vessel tend to occupy the same location. For simplicity, it is also assumed that the vessel moves in a straight line at a rate of 2 m/s, and thus, in 60 s the vessel will have moved 120 m. Further, assume that a receiver station located closest to the towing vessel is station number one and that the stations are numbered monotonically increasing to the end of the streamer. If the receiver stations are located 10 m apart, after 60 s the Nth receiver station will occupy approximately the same location as the N-12th receiver station. After the 60 s, the source will have also advanced 120 m, but if the target is of sufficient depth, the slight change in ray path can be ignored. Thus, the temporal spectral coherence can be compared between a first data set and a second data set that are acquired, in this example, 60 s apart. Note it is possible that some receiver stations from the first data subset may overlap with some receiver stations in the second data subset.

In step 300 extract two data subsets from the recorded seismic data. The second data subset corresponds to data acquired, for example, 60 s after the first data subset has been acquired. Then, extract three groups of receiver data from the first data subset acquired for each streamer. For example, 24 contiguous channels near the front of the streamer, 24 contiguous channels near the midpoint of the streamer and 24 contiguous channels near the end of the streamer. For the second data subset, choose the receiver stations that now occupy approximately the same locations as the receiver stations of the first data subset.

Step 302 is optional and includes de-spiking the data as was discussed above with regard to step 202. In step 304, cross-correlate the receiver data subsets with a pilot signal or reference signal. In step 306, optionally de-ghost the data subsets and apply NMO correction. If some or all of the receivers from subset number two are at different depths than those from subset number one, the receiver ghost will fall at a different frequency, so de-ghosting helps mitigate this issue. However, because the streamers are long, there will be some notch diversity. The spectral notch(es) fall at certain frequencies for the first group, and then fall elsewhere in the second group and so on. If the operator of the seismic survey chooses not to de-ghost the data, it is possible to perform a spectral weighting when combining results from the three groups, so that the S/N estimate and the temporal coherency for those frequencies are discounted where it is expected that the ghost resides for each group. Thus, different frequencies are discounted in the different groups, to provide an overall estimate of the attribute without having to de-ghost.

In step 308, perform a first windowing of the data subsets centered about the target two-way travel time that is a considerably wider than the zone of interest. Then, in step 310 align the data subsets from step 308 with its group midpoint channel(s). For example, consider that a group was comprised of channels 51-74, its midpoint channels would be 62 and 63. For each group in the first data subset, time shift reflection events to align or flatten the event horizons in the target zone of interest. For each group in the second data subset, time shift reflection events to align or flatten event horizons in the target zone of interest. Then, perform a second bulk time shift on each flattened group in the second subset of data so that it is aligned with its corresponding group from the first data subset.

In step 312 apply a second window to the data traces for each group. The window is centered in time about the center of the target time of interest. The second window is selected to be wide enough to permit a good spectral estimate for the lowest frequency of interest, typically, several cycle periods.

In step 314, normalize the trace in each group by the RMS level within the windowed data from step 312 and in step 316 compute the coherence between the respective groups with the first data subset as the input and the second data subset as the output. In other words, trace pairs are between data subset one, group one, first station and between data subset two, group one, first station, . . . , data subset one, group three, last station and subset two, group three, last station. Thus, the cross-spectral density and auto-spectral densities for each trace pair are computed in this step.

In step 318 group coherences are formed by averaging the 24 coherence measurements for group one to form the group one coherence and likewise for groups two and three. An overall coherence attribute is formed in step 320 by combining the group estimates from step 318. Again, the combination can be a weighted spectral combination if, for example, it is desired to discount certain frequencies. The overall attribute can also be formed by combining attribute estimates from more than one streamer. This result can be fed into step 118, in the method illustrated in FIG. 1, for adjusting the frequency sweep for the vibrator.

The S/N ratio estimate or the coherence is just one attribute used to upgrade and/or optimize the frequency sweep. Other attributes may be used and they could include, but need not be limited to: overall amplitude adjustments (up and down with the global level of the energy spectrum in order to not "over-illuminate" the surveyed substructure), spectral balance (ratio of high frequencies to low frequencies should match the needs of the image), cutoff frequencies (i.e., tailoring the high-frequency (HF) and low-frequency (LF) bandwidth limits to better match the nature of the target and overburden), and phase adjustments (temporal placement of the various spectral components within the sweep, the simplest example of which is upsweeps versus downsweeps). For example, if there are other seismic sources operating in the area, that create high levels of cross-talk noise, the phase spectrum of the pilot signal could be modified to reduce the cross-correlation between the surveys. In another case, if it is determined that useful energy cannot be recovered above a certain frequency, or over some range of frequencies, without seriously impacting data acquisition efficiency, the frequency sweep could be modified to exclude those frequencies. The method may also include adaptations to the presence of marine wildlife near the seismic survey, and adaptations to regional sound propagation characteristics (e.g., as propagation range increases, it is possible to reduce the energy in order to control the acoustic footprint). Nearby marine wildlife might be detected by: using crew members who are equipped with binoculars for direct sighting; acoustic listening devices that are connecting to processing equipment designed to detect animal communications; or other automatic means, for example, the use of infrared proximity detection systems. These are just a few examples of attributes that may be used instead of or in combination with the S/N ratio for modifying an existing frequency sweep to better reflect changes in the environment or in the operation of the seismic survey.

For these attributes, the flowchart illustrated in FIGS. 1-3 need to be adapted to reflect them, but the same novel concepts may be used. More specifically, steps 112 to 116 may be modified to account for overall amplitude, spectral balance, cutoff frequencies, phase adjustments or other attributes while the other steps illustrated in FIG. 1 may be used as they are.

This adaptation may become complex when more than one attribute is considered for updating/modifying the frequency sweep in step 118. For example, it is possible to select two attributes to be monitored when calculating the new frequency sweep, and different weights may be attributed to the two attributes when deciding in step 118 whether to adjust the current frequency sweep. Other methods for handling two or more attributes when making the decision in step 118 may be used, i.e., vector maximization, interactive programming, fuzzy sets, value functions, etc.

One or more of the above-discussed embodiments may be implemented with a vibratory source array that includes plural vibratory source elements. There are many vibratory source elements in the field, and the novel methods discussed above are applicable to all of them. An example of a vibratory source element developed by the assignee of the present application is now discussed for exemplary purposes.

A vibro-acoustic source element is now discussed with reference to FIG. 4. Vibro-acoustic source element 400 includes an enclosure 420 that together with pistons 430 and 432 enclose an electro-magnetic actuator system 440 and separate it from ambient 450, which might be water. Enclosure 420 has first and second openings 422 and 424 configured to be closed by pistons 430 and 432. Electro-magnetic actuator system 440 is configured to simultaneously drive pistons 430 and 432 in opposite directions for generating the seismic waves. In one application, pistons 430 and 432 are rigid. However, the pistons may have certain flexibility. Electro-magnetic actuator system 440 may include one or more individual electro-magnetic actuators. FIG. 4 shows two individual electro-magnetic actuators 442 and 444. Irrespective of how many individual electro-magnetic actuators are used in vibro-acoustic source element 400, the actuators may be provided in pairs, and the pairs are configured to act simultaneously in opposite directions on corresponding pistons in order to prevent a "rocking" motion of vibro-acoustic source element 400. However, the method also applies to a vibro-acoustic source element that has only one actuator and one piston.

The size and configuration of the electro-magnetic actuators depend on the acoustic output of the vibro-acoustic source element. FIG. 4 shows that two actuators 442 and 444 are separated by a wall 446, which does not have to be at the middle of actuator system 440. Further, in one embodiment, the two actuators 442 and 444 are formed as a single unit, and there is no interface between them. In yet another application, actuator system 440 is attached to enclosure 420 by an attachment 448. In one application, attachment 448 may be a wall that splits enclosure 420 into a first chamber 420a and a second chamber 420b. If attachment 448 is a wall, actuators 442 and 444 may be attached to wall 448 or may be attached to enclosure 420 by other means in such a way that actuators 442 and 444 do not contact wall 448.

To provide pistons 430 and 432 with the ability to move relative to enclosure 420 in order to generate seismic waves, a sealing mechanism 460 is located between the pistons and the enclosure. Sealing mechanism 460 may be configured to slide back and forth with the pistons. Other sealing mechanisms may be used as will be recognized by those skilled in the art.

The embodiment shown in FIG. 4 may also include a pressure regulation mechanism 470 (e.g., a pneumatic regulation mechanism if air is used). Pressure regulation mechanism 470 may be used to balance the external pressure of ambient 450 with a pressure of the medium enclosed by enclosure 420 to reduce the workload of actuator system 440.

Pressure regulation mechanism 470 may be fluidly connected to a pressure source (not shown) on the vessel towing vibro-acoustic source element 400. Pressure regulation mechanism 470 may also be configured to provide an additional force on pistons 430 and 432, e.g., at lower frequencies, to increase an acoustic output of the vibro-acoustic source element and also to extend a frequency spectrum of the vibro-acoustic source element.

To provide a smooth motion of shaft 480 relative to enclosure 420 (e.g., to prevent shaft wobbling motion), a guiding system 490 may be provided. In one application, heat is generated by actuator system 440. This heat may affect the motion of the shafts and/or the functioning of actuator system 440. For this reason, a cooling system 494 may be provided at the vibro-acoustic source element. Cooling system 494 may be configured to transfer heat from actuator system 440 to ambient 450.

Pistons 430 and 432 may be driven to generate an output having a predetermined frequency spectrum. To control this output, a local control system 475 may be located, inside, outside or both, relative to enclosure 420. Local control system 475 may be configured to act in real-time to correct the output of vibro-acoustic source element 400. As such, local control system 475 may include one or more processors connected to sensors that monitor the status of vibro-acoustic source element 400 and provide commands for the actuator system 440 and/or the pressure regulation mechanism 470.

The source arrays discussed above may be made up entirely of the vibro-acoustic source element illustrated in FIG. 4. However, the source arrays may be made up of different vibroseis source elements or a combination of those shown in FIG. 4 and those known in the art. Depending on the vibro-acoustic source element, the processing device calculating the new frequency sweep may determine different driving signals for different source elements because the driving signal is dependent on the specific construction and characteristics of the considered vibro-acoustic source element. A driving signal is a signal applied to the driving element of the source element for producing the desired frequency sweep. Thus, the driving signal may correspond to a frequency sweep as known in the art, i.e., a signal that includes plural frequencies produced one at a time in a certain temporal order. However, the driving signal is not limited to traditional frequency sweeps, but may include a non-continuous signal, a signal that includes plural frequencies emitted at the same time, etc. Further, when a modified frequency sweep is determined in step 124 in FIG. 1, it would be understood by those skilled in the art that a new driving signal is also calculated to obtain the modified frequency sweep. The driving signal may be calculated in the same processing device that determines the new frequency sweep, or it may be calculated in a different processing device, for example, one collocated with the source element.

Note that the above discussion about the driving signal is valid for both a vibro-acoustic source element and an array of vibro-acoustic source elements, i.e., a marine source array. If a marine source array is considered, then the arrangement (geometry) of the vibro-acoustic source elements needs to be considered, and a driving signal for the whole source array may be determined as noted above. The geometry of the source elements is considered, for example, in step 106 in FIG. 1. However, because of the different distances between the vibro-acoustic source elements of the marine source array, various time delays may be calculated and applied to the elements making up the marine source array. The same is true if multiple land source elements are used.

Note too, in particular for separable simultaneous source data sets, more than one drive signal may be used at the same time. For example though the use of multiple towed source arrays that might be towed by different vessels to acquire data at a different offset to improve cross-line spatial sampling or for wide azimuth surveys. Usually the source drive signals are designed to be separable either by some form of coding scheme like phase encoding or by some form of spectral separation or by some form of time separation or by designing driving signals that are weakly correlated with respect to one another or by separating sources by distance for example by using separate source vessels. For these cases the attribute estimation process could be modified to include steps to separate the data sets so that an overall attribute could be formed representative of each survey with results and the necessary sweep adjustments communicated via a radio link, communication cable or other means to the various source arrays whether they be towed by the same vessel or different vessels. Also for this case an attribute useful for measuring the separation cross-talk between the simultaneous surveys may be of value to the sweep adjustment process.

Figure 5:
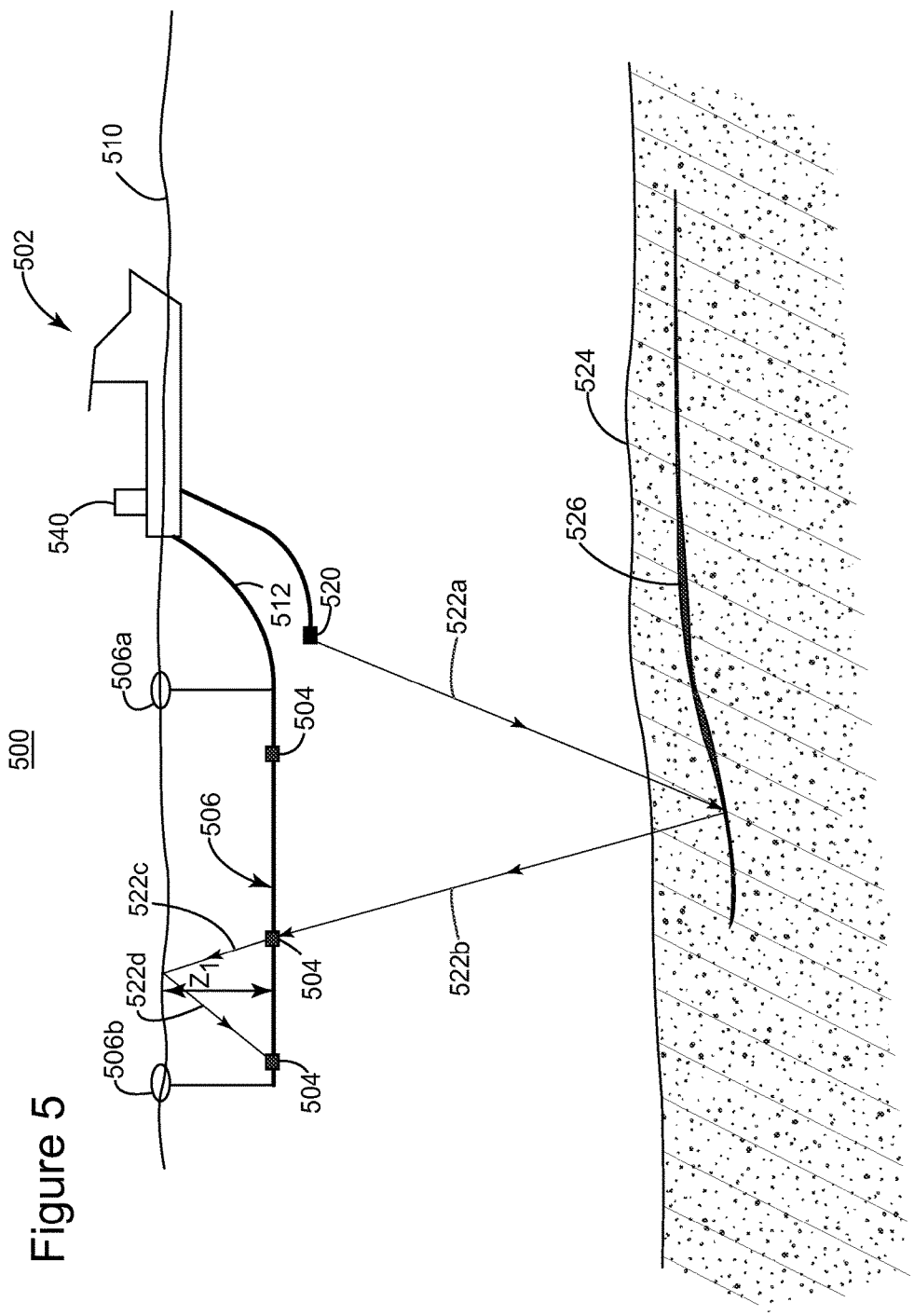
FIG. 5 is a schematic diagram of a seismic survey.

The above-discussed methods may be implemented during a marine seismic survey 500 as illustrated in FIG. 5, in which a vessel 502 tows plural receivers 504 distributed along a streamer 506. Vessel 502 may tow plural streamers 506 at the same time. The streamers may be disposed horizontally, i.e., lying at a constant depth $z_1$ relative to the ocean surface 510. The streamers may be disposed vertically, i.e. in an over/under configuration useful separating up-going and down-going energy. Also, the plural streamers 506 may form a constant angle (i.e., the streamers may be slanted) with respect to the ocean surface, or they may have a curved profile as discussed later.

Still with reference to FIG. 5, each streamer may have a head float 506a and a tail float 506b connected to respective streamer ends for maintaining the given depth $z_1$. Birds (not shown), a depth control device, can also be used to help maintain a desired tow profile. A front-end gear 512 that includes various cables connects streamers 506 to vessel 502. Vessel 502 also tows a seismic source 520 configured to generate an acoustic wave 522a. Seismic source 520 may a vibratory source array that includes plural source elements as described in FIG. 2. Acoustic wave 522a propagates downward and penetrates the seafloor 524, eventually being reflected by a reflecting structure 526 (reflector). The reflected acoustic wave 522b propagates upward and is detected by receiver 504. For simplicity, FIG. 5 shows only one path 522a corresponding to the acoustic wave. However, the acoustic wave emitted by source 520 may be substantially spherical, e.g., it propagates in all directions starting from source 520. Energy associated with the reflected acoustic wave 522b is recorded by the various receivers 504 (the recorded signals are called traces), while energy associated with wave 522c passes the receivers 504 and arrives at the water surface 510. Since the interface between the water and air is well-approximated as a quasi-perfect reflector (i.e., the water surface acts as a mirror for acoustic waves), reflected wave 522c is reflected back toward another receiver 504 as shown by wave 522d in FIG. 5. Wave 522d is normally referred to as a ghost wave because it is due to a spurious reflection. Ghosts are also recorded by receivers 504, but with a reverse polarity and a time lag relative to primary wave 522b. The degenerative effect that the ghost arrival has on seismic bandwidth and resolution is known. In essence, interference between primary and ghost arrivals causes notches, or gaps, in the frequency content recorded by the detectors, which reduces the useful bandwidth.

The recorded traces may be used to determine the subsurface (i.e., earth structure below surface 524) and to determine the position and presence of reflectors 526. However, ghosts disturb the final subsurface image's accuracy and, for at least this reason, various methods exist for removing ghosts, i.e., deghosting, from recorded seismic data. One or more of these methods may be implemented in a processing device 540 located on board vessel 502. The processing device may be used to process the subsurface image based on a subset of the recorded seismic data, as discussed above with regard to FIG. 1.

Figure 6:
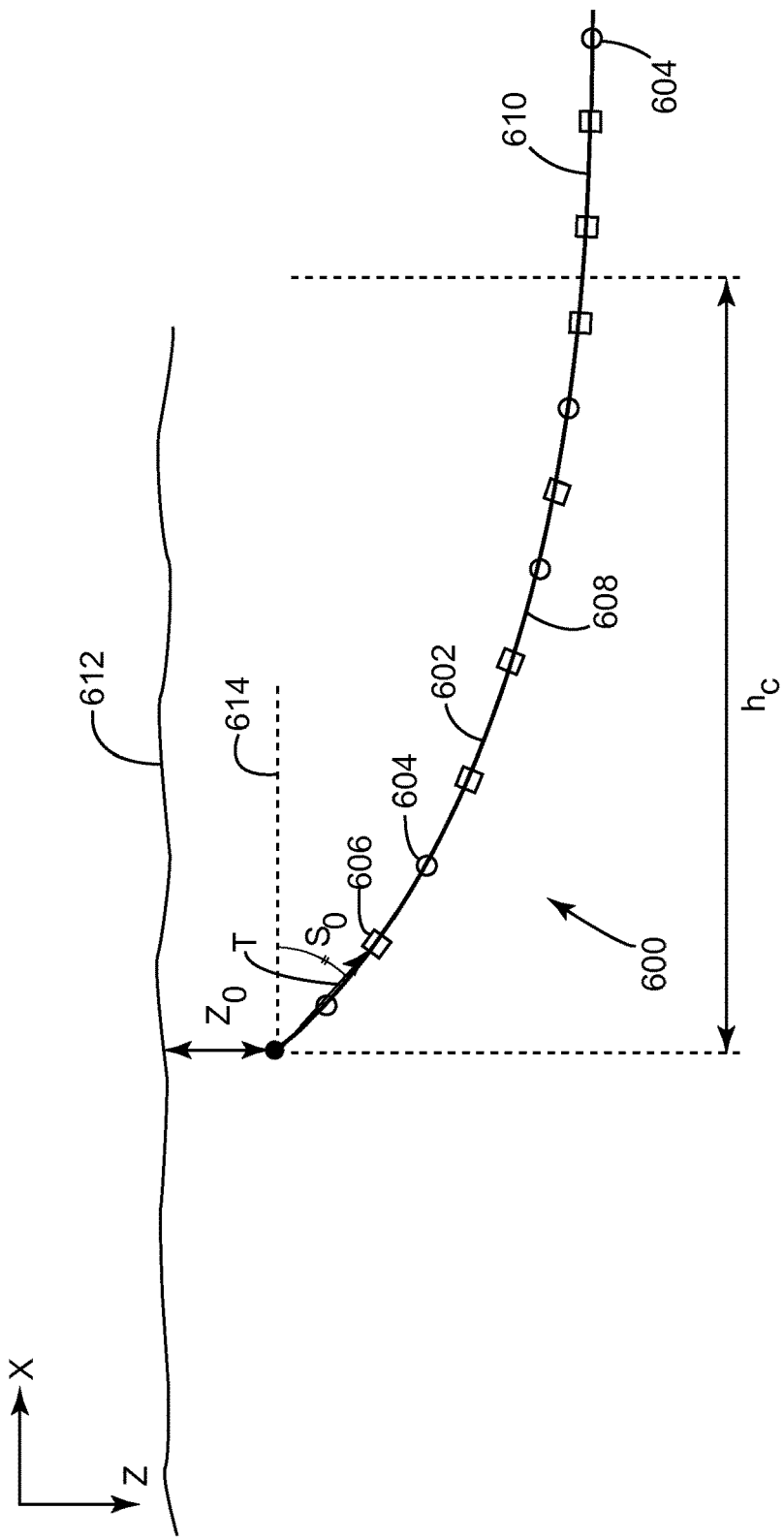
FIG. 6 is a schematic diagram of a curved streamer.

If the novel methods discussed above are implemented in a marine environment, streamers, OBCs, OBNs and/or AUVs may be used to carry the seismic receivers. In the following, an exemplary curved streamer configuration is discussed with regard to FIG. 6. The curved streamer 600 includes a body 602 having a predetermined length, plural receivers 604 provided along the body, and plural birds 606 provided along the body for maintaining the selected curved profile. The streamer is configured to flow underwater when towed so that the plural receivers are distributed along the curved profile. The curved profile may be described by a parameterized curve, e.g., a curve described by (i) a depth $z_0$ of a first receiver (measured from the water surface 612), (ii) a slope $s_0$ of a first portion T of the body with an axis 614 parallel with the water surface 612, and (iii) a predetermined horizontal distance $h_c$ between the first receiver and an end of the curved profile. Note that not the entire streamer has to have the curved profile. In other words, the curved profile should not be construed to always apply to the entire length of the streamer. While this situation is possible, the curved profile may be applied to only a portion 608 of the streamer. In other words, the streamer may have (i) only a portion 608 with the curved profile or (ii) a portion 608 with the curved profile and a portion 610 with a flat profile, the two portions being attached to each other.

Figure 7:
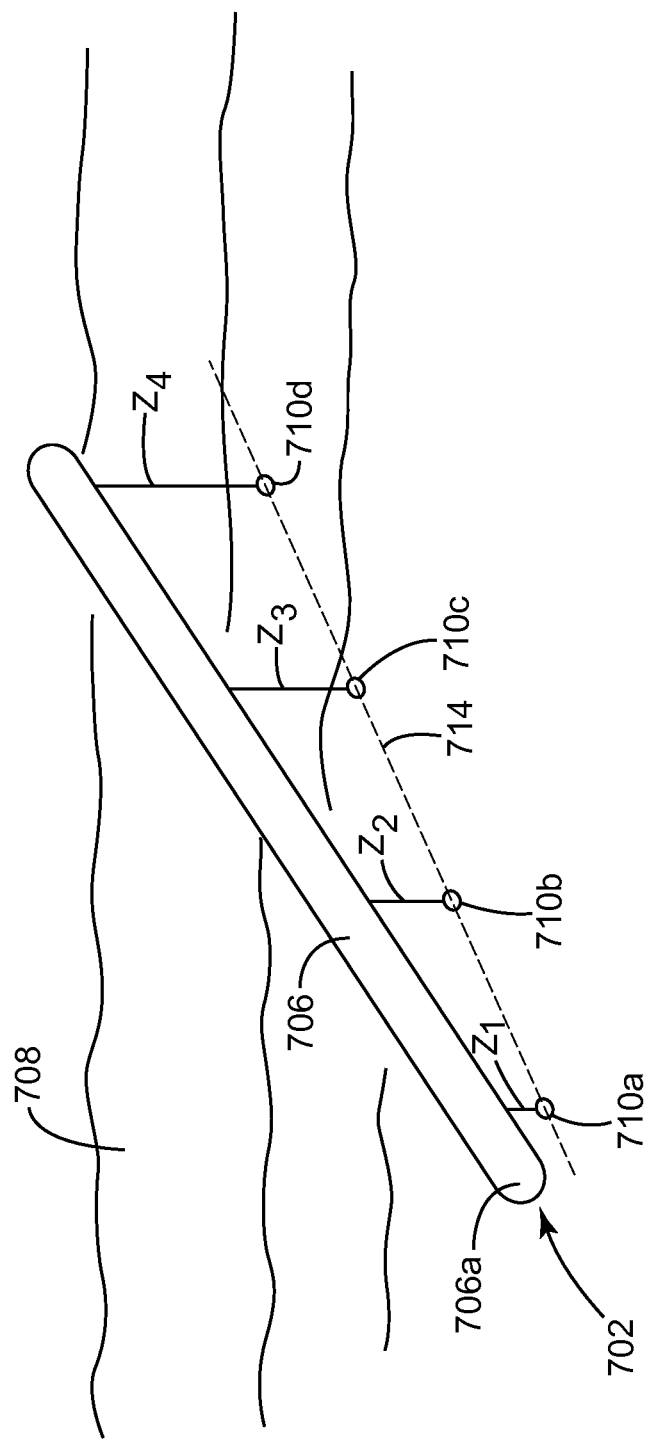
FIG. 7 is a schematic diagram of a multi-level seismic source.

The source array may be a multi-level source. A multi-level source 700 has one or more sub-arrays. The first sub-array 702 has a float 706 configured to float at the water surface 708 or underwater at a predetermined depth. Plural source elements 710a-d are suspended from float 706 in a known manner. A source element may be a vibratory source element as discussed with regard to FIG. 4. A first source element 710a may be suspended closest to head 706a of float 706, at a first depth z1. A second source element 710b may be suspended next, at a second depth z2, different from z1. A third source element 710c may be suspended next, at a third depth z3, different from z1 and z2, and so on. FIG. 7 shows, for simplicity, only four source elements 710a-d, but an actual implementation may have any desired number of source elements.

The depths z1 to z4 of the source elements of the first sub-array 702 may obey various relationships. In one application, the depths of the source elements monotonically increase from the head toward the tail of the float, i.e., $z1<z2<z3<z4$. In another application, the depths of the source elements monotonically decrease from the head to the tail of the float. In another application, the source elements are slanted, i.e., provided on an imaginary line 714. In still another application, line 714 is a straight line. In yet another application, line 714 is curved, e.g., part of a parabola, circle, hyperbola, etc. In one application, the depth of the first source element for the sub-array 702 is about 5 m and the greatest depth of the last source element is about 8 m. In a variation of this embodiment, the depth range is between 8.5 and 10.5 m or between 11 and 14 m or between 20 and 30 m. In another variation of this embodiment, when line 714 is straight, the depths of the source points increase by 0.5 m from a source element to an adjacent source element. Those skilled in the art would recognize that these ranges are exemplary and these numbers may vary from survey to survey. A common feature of all these embodiments is that the source points have variable depths so that a single sub-array exhibits multi-level source points.

Figure 8:
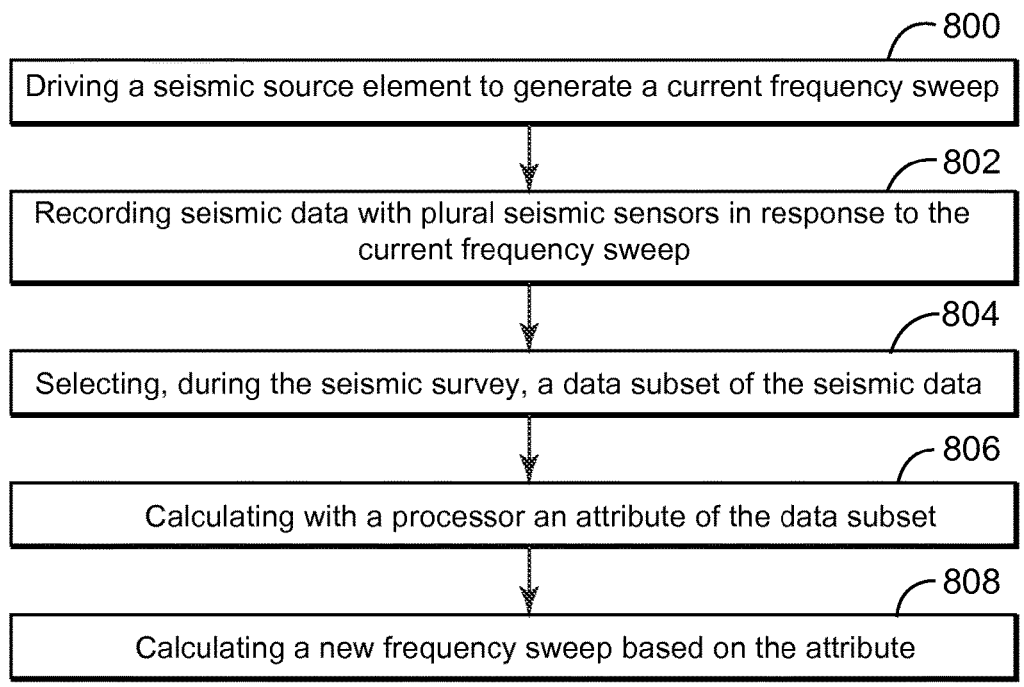
FIG. 8 is a flowchart of a method for updating a current frequency sweep of a vibratory source according to an embodiment.

According to an exemplary embodiment illustrated in FIG. 8, there is a method for adapting a frequency sweep for a vibro-acoustic source element configured to generate acoustic waves during a seismic survey. The method includes a step 800 of driving a seismic source element to generate a current frequency sweep; a step 802 of recording seismic data with plural seismic sensors in response to the current frequency sweep; a step 804 of selecting, during the seismic survey, a data subset of the seismic data; a step 806 of calculating with a processing device an attribute of the data subset; and a step 808 of calculating a new frequency sweep based on the attribute.

The driving signal was mentioned above but it was not limited to any specific type. In one embodiment, the driving signal may include pseudorandom sequences rather than just swept sine wave sweeps. For this case, spectral amplitude reshaping could be accomplished using various methods. According to a first approach, it is possible to increase the temporal amplitude, for example, by convolving the pseudorandom sweep with a reshaping filter. One aspect that should be considered with this approach is that it may exceed equipment constraints, for example, stroke if the low frequency content is increased and the current or voltage if the high frequency content is increased.

According to a second approach, it is possible to use the method disclosed in Ser. No. 13/335,093, filed on Dec. 22, 2011, entitled Low-Frequency Content Boost for vibratory seismic source and method, the entire content of which is incorporated herein by reference. This approach is more complicated and tries to increase the dwell time over particular frequency bands, but if the amount of excitation time is fixed this may tend to boost some frequencies and reduce others. Other approaches may be taken as would be recognized by those skilled in the art, for example, as disclosed in U.S. Patent Application Publication No. US2013/0100766, entitled "Method and Device for Determining a Driving Signal for Vibroseis Source," filed on Mar. 8, 2012 and U.S. Ser. No. 13/677,661, entitled "Device and Method for Continuous Data Acquisition" (assigned to the assignee of the present application), the content of which is incorporated herein by reference.

Figure 9:
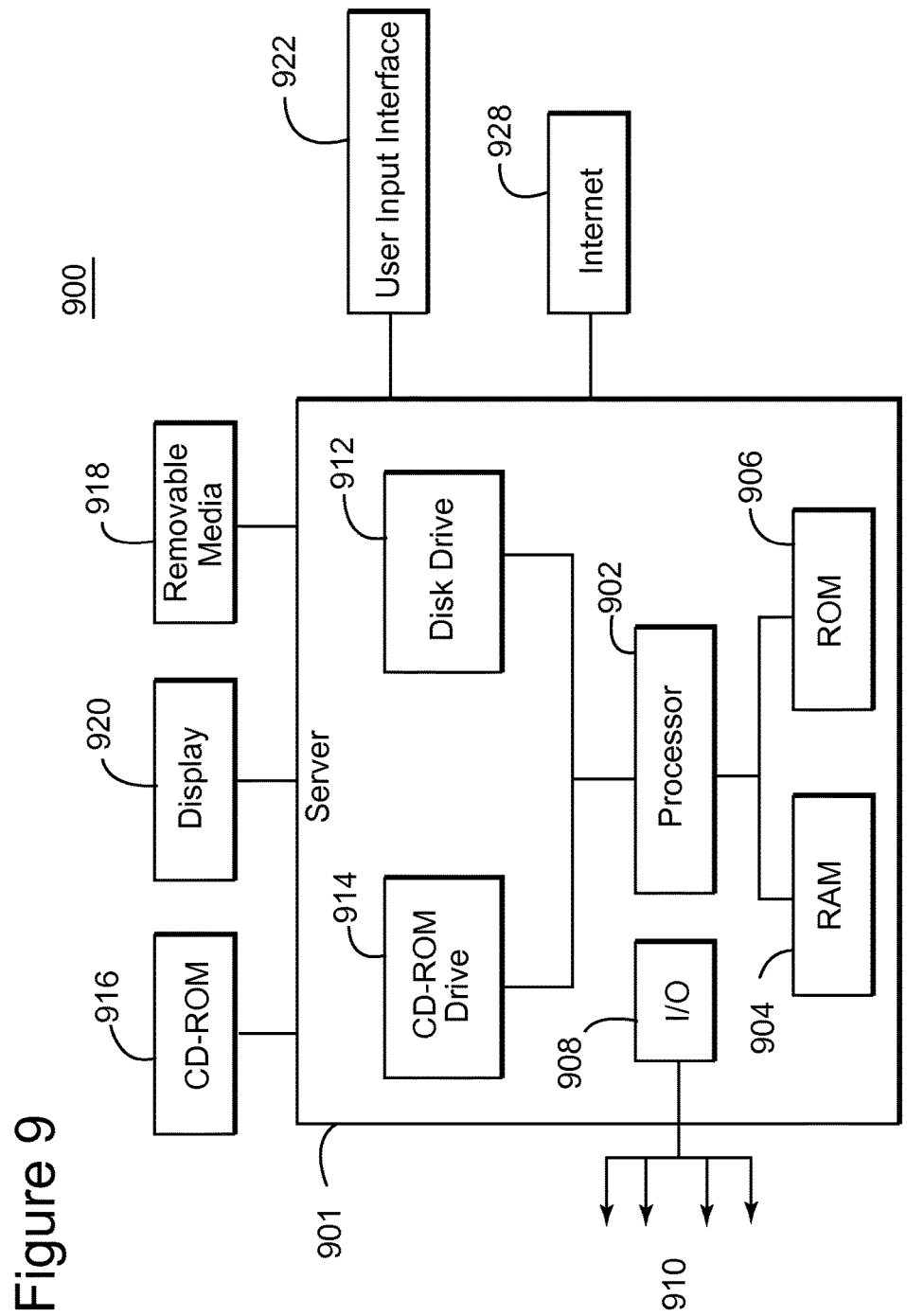
FIG. 9 is a schematic diagram of a processing device.

An example of a representative processing device or control system capable of carrying out operations in accordance with the exemplary embodiments discussed above is illustrated in FIG. 9. Hardware, firmware, software or a combination thereof may be used to perform the various steps and operations described herein.

The exemplary processing device 900 suitable for performing the activities described in the exemplary embodiments may include server 901. Such a server 901 may include a central processor unit (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910, to provide control signals and the like. For example, processor 902 may communicate with the sensors, electro-magnetic actuator system, and/or the pneumatic mechanism. Processor 902 carries out a variety of functions as are known in the art, as dictated by software and/or firmware instructions.

Server 901 may also include one or more data storage devices, including hard disk drives 912, CD-ROM drives 914 and other hardware capable of reading and/or storing information such as a DVD, etc. In one embodiment, software for carrying out the above-discussed steps may be stored and distributed on a CD-ROM 916, removable media unit 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma displays, cathode ray tubes (CRTs), etc. A user input interface 922 is provided, including one or more user interface mechanisms such as a mouse, keyboard, microphone, touch pad, touch screen, voice-recognition system, etc.

Server 901 may be coupled to other computing devices, such as the equipment of a vessel, via a network. The server may be part of a larger network configuration as in a global area network (GAN) such as the Internet 928.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices or magnetic storage devices such a floppy disk or magnetic tape. Other non-limiting examples of computer-readable media include flash-type memories or other known types of memories.

The disclosed exemplary embodiments provide a source array, computer software and a method for updating a frequency sweep based on at least one attribute of the source and/or an environment of the source. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for adapting a frequency sweep for a vibro-acoustic source element that is configured to generate acoustic waves during a seismic survey, the method comprising:
   driving a seismic source element to generate a current frequency sweep;
   recording seismic data with plural seismic sensors in response to the current frequency sweep;
   selecting, during the seismic survey, a data subset of the seismic data, wherein the data subset has a size less than 10% of the seismic data;
   calculating with a processing device an attribute based on the data subset;
   calculating a new frequency sweep based on the attribute; and
   driving the seismic source element with the new frequency sweep.

2. The method of claim 1, wherein the data subset spans minutes or hours of recording and the seismic data represents days of recording.

3. The method of claim 1, wherein the calculating an attribute step comprises:
   receiving the attribute as feed-back from an image processing step.

4. The method of claim 1, wherein the attribute includes a signal to noise ratio estimate of the selected data subset.

5. The method of claim 1, wherein calculating a new frequency sweep based on the attribute includes overall amplitude adjustments of an energy spectrum generated by the source element.

6. The method of claim 1, wherein the attribute includes a ratio of high frequencies to low frequencies of the current frequency sweep.

7. The method of claim 1, wherein the attribute includes cutoff frequencies to be applied to the current frequency sweep to better match a nature of a surveying target.

8. The method of claim 1, wherein the attribute includes phase adjustments to various spectral components of the current frequency sweep.

9. The method of claim 1, wherein the attribute is related to marine wildlife or regional sound propagation characteristics.

10. The method of claim 1, wherein the frequency sweep is a swept sine wave signal.

11. The method of claim 1, wherein the frequency sweep is a bandlimited pseudorandom signal.

12. The method of claim 1, wherein the attribute includes at least two of a signal to noise ratio of the selected data subset, overall amplitude adjustments of an energy spectrum generated by the source element, a ratio of high frequencies to low frequencies of the current frequency sweep, cutoff frequencies to be applied to the current frequency sweep to better match a nature of a surveying target, phase adjustments to various spectral components of the current frequency sweep, marine wildlife characteristics, and regional sound propagation characteristics.

13. The method of claim 1, further comprising:
   sending the new frequency sweep to the seismic source element during the seismic survey; and
   using the new frequency sweep instead of the current frequency sweep for the reminder of the seismic survey.

14. The method of claim 1, wherein the source element is a vibratory device.

15. The method of claim 1, wherein the source element is a marine device.

16. The method of claim 1, wherein a plurality of drive signals are updated, wherein each drive signal excites a unique source array that is deployed and operated simultaneously in such a fashion as to create separable data sets.

17. The method of claim 1, wherein the attribute includes an estimate of signal coherence of the selected data set.

18. A method for adapting a frequency sweep for a vibro-acoustic source element that is configured to generate acoustic waves during a seismic survey, the method comprising:
   driving a seismic source element to generate a current frequency sweep;
   recording seismic data with plural seismic sensors in response to the current frequency sweep;
   selecting, during the seismic survey, a data subset of the seismic data, wherein the data subset has a size less than the seismic data;
   calculating with a processing device a signal to noise ratio estimate of the selected data subset;
   calculating a new frequency sweep based on the signal to noise ratio estimate; and
   driving the seismic source element with the new frequency sweep.

19. The method of claim 18, wherein the frequency sweep is a swept sine wave signal or a bandlimited pseudorandom signal.

20. A method for adapting a frequency sweep for a vibro-acoustic source element that is configured to generate acoustic waves during a seismic survey, the method comprising:
   driving a seismic source element to generate a current frequency sweep;
   recording seismic data with plural seismic sensors in response to the current frequency sweep;
   selecting, during the seismic survey, a data subset of the seismic data, wherein the data subset has a size less than of the seismic data;
   calculating with a processing device an attribute based on the data subset;
   calculating a new frequency sweep based on the attribute; and
   driving the seismic source element with the new frequency sweep.

* * * * *